United States Patent Office 3,179,057
Patented Apr. 20, 1965

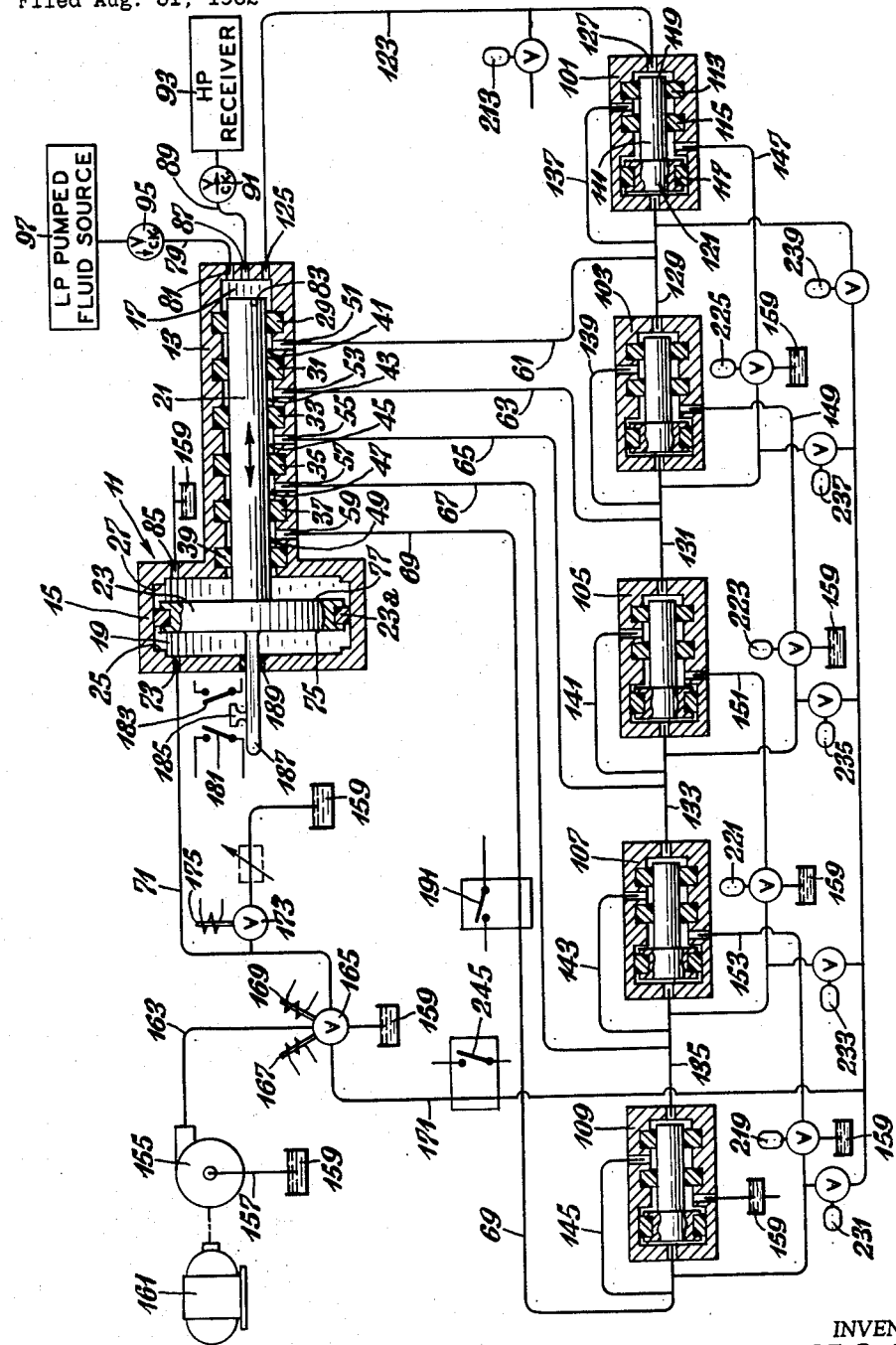

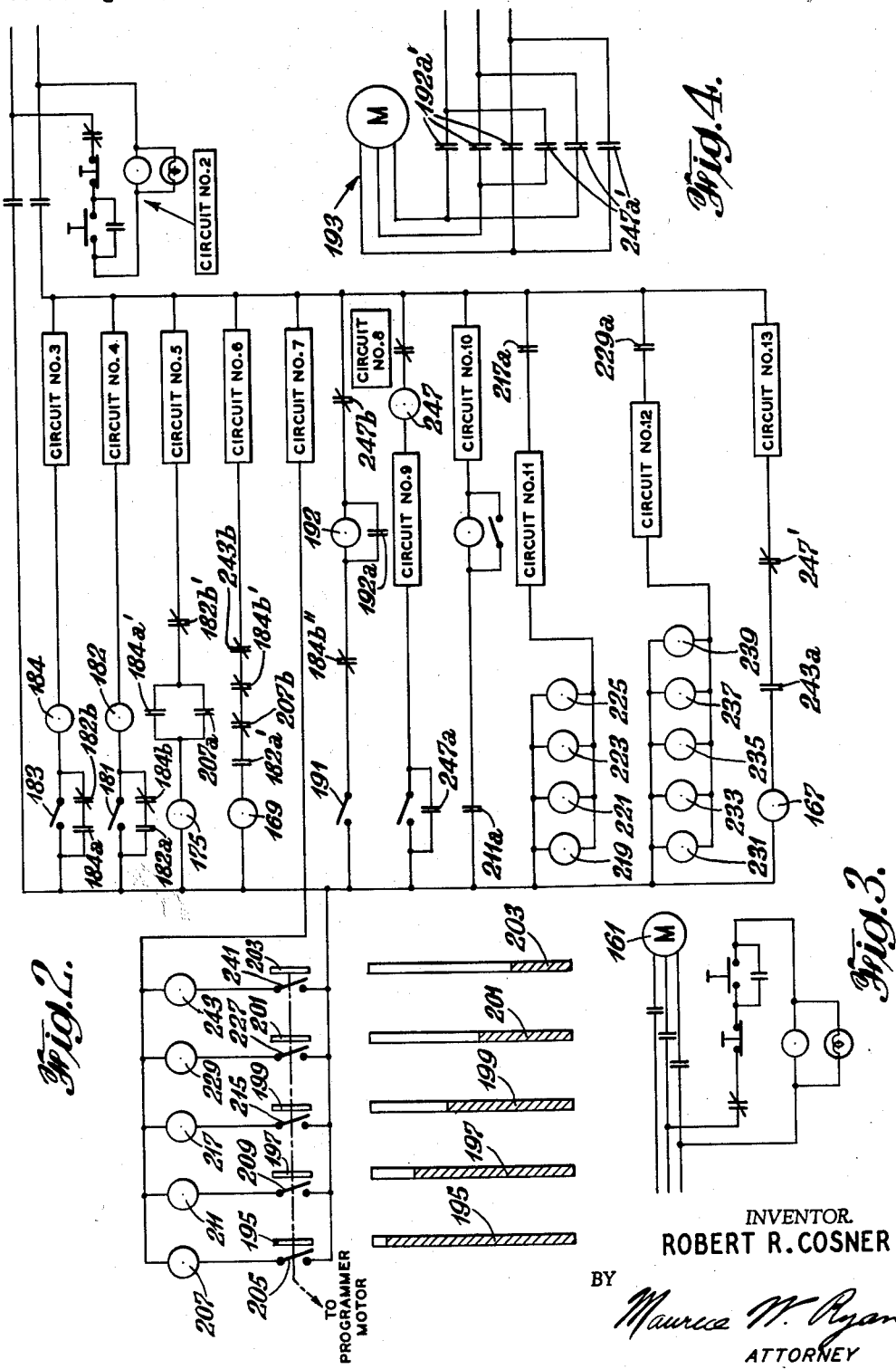

3,179,057
EQUIPMENT SYSTEM FOR PRODUCING ULTRA-HIGH PROCESS PRESSURES
Robert R. Cosner, South Charleston, W. Va., assignor to Union Carbide Corporation, a corporation of New York
Filed Aug. 31, 1962, Ser. No. 220,719
6 Claims. (Cl. 103—50)

The present invention relates to apparatus for producing extremely high process pressures and more particularly to a novel system and equipment arrangement which overcomes certain of the very critical limitations respecting known packing materials encountered in conventional high pressure process equipment.

Many present day industrial processes which include high pressure intensifier and pumping componentry have been found to experience increased efficiency and higher output production rates in proportion to the extent to which process pressures can be increased. The need for presently high and desirably higher process pressures in the chemical manufacturing industry, for example, is well known and widely acknowledged. Efforts to attain these desired higher pressures have been limited mainly by the demonstrated inability of conventional packings in positive displacement pumping and intensifier equipment to withstand the higher pressures. Where, in processes involving pressures of 30,000 p.s.i.g. to 40,000 p.s.i.g., attempts are made to operate at still higher pressures, the consequent reduction in useful packing life experienced renders the higher pressure operation impractical. As a consequence, continued efforts are in progress in industry to provide new more suitable packing materials and packing designs. To date none of the known efforts in this direction has produced a completely satisfactory solution to the problem.

In view of the unsuccessful efforts to produce new more satisfactory packing materials and packing designs, I have conceived the present invention on the rationale of adaptation of conventional commercially available packing materials to a novel system for producing ultra-high process pressures. Accordingly, the present invention comprehends an ultra-high pressure system wherein reciprocating plungers or pistons of positive displacement pumping and intensifier apparatus are packed in consecutive locations along their axial length with conventional packing materials in standard arrangement. A hydraulic medium, which is also preferably a lubricant, is introduced, under descending discrete pressures, into respective zones defined between the individual packing sections. In this manner, assurance is provided that no single packing section will be subjected to a higher pressure differential loading than its designed working rating and the total pressure differential between a high pressure process fluid zone and an environment ambient the apparatus (normally, the atmosphere) is effectively cascaded in successive pressure steps along the length of the pumping apparatus. The present invention also comprehends a novel equipment system for producing these pressures and for operating the pumping apparatus continuously at hithero unattainable high pressures.

With the foregoing and other features in view which shall hereinafter more fully appear, the present invention will now be described in greater particularity and with reference to the appended drawings wherein:

FIGURE 1 is a schematic flow diagram of the mechanical portion of an ultra-high process pressure system according to the present invention;

FIGURE 2 is a schematic electrical diagram of the electrical control circuitry comprised in a system according to the present invention;

FIGURE 3 is a schematic electrical diagram of a main hydraulic pump motor and related circuit for use with the present invention and FIGURE 4 is a schematic electrical diagram of a replenishing system programmer motor and related circuit for use with the present invention.

Referring to FIGURE 1 of the drawings, there is shown a positive displacement pump, designated generally as 11, comprising a main body 13 to which is affixed an actuating head 15. The main body and the actuating head define pumped fluid and actuating fluid chambers, preferably cylindrical, interior of the pump, which are designated respectively 17 and 19. A plunger 21 is arranged in the pumped fluid chamber 17 and attached at one end to a piston 23 which is arranged in actuating fluid chamber 19. The plunger and piston, both of which are also preferably cylindrical in form, move reciprocally during operation of the pump between two positions defined by circumferential shoulders 25 and 27 arranged interior of actuating fluid chamber 19. Six stages of packing 29, 31, 33, 35, 37 and 39 are shown arranged longitudinally along plunger 21 in conventional packing wells in the interior of main body 13, sealably engaging the outer periphery of the plunger 21. A conventional packing 23a may also be provided on piston 23. Annular pressure zones 41, 43, 45, 47, and 49 are defined respectively between the packing pairs 29–31, 31–33, 33–35, 35–37 and 37–39. Pressure fluid ports 51, 53, 55, 57 and 59 connect the pressure zones 41, 43, 45, 47, and 49 respectively to pressure fluid conduits 61, 63, 65, 67 and 69 exterior of the pump 11.

In the embodiment shown in the drawings, the compression stroke of the pump 11 involves a movement of plunger 21 and piston 23 from left to right, which is accomplished by introducing a hydraulic medium under pressure into the actuating fluid chamber 19 from an actuating fluid conduit 71 through an actuating fluid port 73 to impinge on surface 75 of piston 23. During the compression stroke, surface 77 of piston 23 will expel hydraulic fluid from actuating fluid chamber 19 through vent 85 in actuating head 15 to a hydraulic fluid reservoir 159 at atmospheric pressure, and a working face 83 on plunger 21 will displace pumped fluid from pumped fluid chamber 17 through a discharge port 87 into a discharge conduit 89 which connects, through a discharge check valve 91, to a high pressure receiver 93 or other process equipment to be maintained at the desired ultra-high pressure. The return stroke involves a movement of the plunger/piston 21/23 from right to left, and is accomplished normally by pressure of the pumped fluid entering chamber 17 from an intake conduit 79 through an intake port 81 to impinge on working face 83 of plunger 21. Intake conduit 79 connects through an intake check valve 95 to a low pressure intake source 97 in the process equipment. If the intake pressure is inadequate to effect the return stroke properly, vent 85 may be connected into the hydraulic system to introduce sufficient return stroke hydraulic pressure against the surface 77 of piston 23. The areas of piston 23's surface 75 and plunger 21's working face 83 are selected to have a ratio inversely equal to the ratio of the corresponding pressures of the pressurized hydraulic medium and the pumped fluid during the compression stroke. In this manner a hydraulic driving system with an output pressure of say 4,000 to 5,000 p.s.i.g. can be utilized to pump against a discharge pressure of 100,000 p.s.i.g. or more During each compression stroke the hydraulic medium (which, as noted above, is also preferably a packing lubricant) is introduced in a series of discrete controlled descending pressures into each of the pressure zones 41, 45, 47, and 49. Let it be assumed for the purposes of illustration that the discharge pressure against which the pump must work is 115,000 p.s.i.g. and that vent 85 in the acuating head 15 connects to a hydraulic system fluid reservoir 159 at atmospheric pressure. If, under these circumstances, hydraulic fluid at 100,000, 80,000 60,000, 40,000 and 20,000 p.s.i.g. is introduced respectively into pressure zones 41, 43, 45, 47 and 49, packing 29 will be subjected to a pressure differential loading of only 15,000 p.s.i.g. and each of the other packings 31, 33, 35, 37 and 39 will be subjected to a pressure differential loading of only 20,000 p.s.i.g. Thus no single packing is required to withstand more than 20,000 p.s.i.g. maximum pressure and conventional packing materials suitable for such service are readily useable. While, in the illustrated and described embodiment, the plunger 21 is shown sealed with six packings and pressure is cascaded downward through five zones in approximately 20,000 p.s.i.g. steps, the packings may be more or less in number and the pressures adjusted to insure that the resultant pressure drop across any one packing will be within the nominal pressure rating for that packing. Here it should be noted that while most of packings are subjected to equal differential pressure loading of 20,000 p.s.i.g., packing 29 is loaded only to 15,000 p.s.i.g. While not essential to the operation of the present invention, subjecting the packing contiguous to the pump fluid zone to a somewhat lesser pressure than other packings will prolong its useful life, inasmuch as this particular packing will not be lubricated from both sides as will the others, due to the fact that it has hydraulic lubricating fluid impinging on only one side, with pump fluid impinging on the other.

To produce the staged or cascaded pressures for the hydraulic fluid medium in the pressure zones between the packings, an array of staging cylinders 101, 103, 105, 107, and 109 is provided. The staging cylinders are all structurally similar, each comprising an integrally arranged plunger/piston 111, disposed to move reciprocally between two positions interior of a staging cylinder body 101 etc., and each being provided with packings 113, 115 on the plunger and a packing 117 on the piston. As with the main pump 11, working faces 119 and 121 on the integral plunger/piston 111 are designed to have an area ratio inversely equal to the ratio of the corresponding pressures of the fluid media at each staging cylinder end. A staging pressure conduit 123 is provided to connect a staging pressure port 125 in the pump 11 to a staging pressure inlet port 127 in the staging cylinder 101. The automatically cascaded balancing pressures provided by the staging cylinder system are initiated through this conduit.

Using the above-assumed pumped fluid discharge pressure of 115,000 p.s.i.g., the plunger 21 working face 83 causes transmission of this pressure, during each discharge or compression stroke, through pumped fluid chamber 17, staging pressure port 125, staging pressure conduit 123, and staging pressure inlet port 127 to impinge on working face 119 of plunger/piston 111 in staging cylinder 101. The plunger/piston 111 is urged from right to left in the staging cylinder 101, causing working face 121 on the piston portion to produce 100,000 p.s.i.g. pressure at the low pressure end of this particular staging cylinder. The 100,000 p.s.i.g. pressure is transmitted through a second staging pressure conduit 129 to the second staging cylinder 103 therein to impinge on a high pressure plunger/piston working face in that staging cylinder. Pressure conduit 61 connects to the second staging pressure conduit 129 and provides the path through which the 100,000 p.s.i.g. pressure is transmitted to pressure zone 41. The plunger/piston of staging cylinder 103 is urged from right to left by the 100,000 p.s.i.g. pressure, causing the low pressure working face thereon to produce 80,000 p.s.i.g. pressure in a third staging pressure conduit 131. The 80,000 p.s.i.g. pressure is transmitted through conduit 131 to third staging cylinder 105, therein to impinge on a high pressure plunger/piston working face in that staging cylinder. Pressure conduit 63 connects to the third staging pressure conduit 131 and provides the path through which the 80,000 p.s.i.g. pressure is transmitted to pressure zone 43. Movement of the plunger/pistons in all of the staging cylinders occurs simultaneously as described above to produce the cascaded pressures down to the 20,000 p.s.i.g. in pressure zone 49 through pressure conduit 69 which connects directly to the low pressure end of the last staging cylinder 109.

In order to subject the packings in the staging cylinders to pressure differential loadings only within their design ratings, an array of staging pressure feedback conduits 137, 139, 141, 143, 145, 147, 149, 151 and 153 is provided. Feedback conduit 137 connects the second staging pressure conduit 129 at 100,000 p.s.i.g. to a pressure zone defined between packings 113 and 115 in staging cylinder 101 and feedback conduit 147 connects the third staging pressure conduit 131 at 80,000 p.s.i.g. to a pressure zone defined between packings 115 and 117 in staging cylinder 101. In this manner it is insured that packing 113 is subjected to only 15,000 p.s.i.g. pressure differential loading and packings 115 and 117 are each subjected to pressure differential loading of only 20,000 p.s.i.g. Similarly, feedback conduits 139 and 149 respectively connect the third staging pressure conduit 131 at 80,000 p.s.i.g. and the fourth staging pressure conduit 133 at 60,000 p.s.i.g. to appropriate pressure zones defined between the packings in staging cylinder 103; feedback conduits 141 and 151 respectively connect the fourth staging pressure conduit 133 at 60,000 p.s.i.g. and the fifth staging pressure conduit 135 at 40,000 p.s.i.g. to appropriate zones defined between the packings in staging cylinder 105; and feedback conduits 143 and 153 respectively connect the fifth staging pressure conduit 135 at 40,000 p.s.i.g. and pressure conduit 69 at 20,000 p.s.i.g. to appropriate pressure zones defined between the packings in staging cylinder 107. Feedback conduit 145 connects pressure conduit 69 at 20,000 p.s.i.g. to the zone defined between the two plunger packings in staging cylinder 109 and the zone defined between the second plunger packing and the piston packing in staging cylinder 109 is vented to the hydraulic fluid reservoir 159 at atmospheric pressure. Here it should be noted that wherever venting is indicated, hydraulic venting is intended, scil. to a gravity head hydraulic tube, reservoir or the like, in order to provide the low pressure sides of the last packings with lubrication, while imposing thereon no greater differential pressure loading than packing design ratings permit.

Hydraulic fluid under pressure to operate the entire system is provided by a constant delivery pump 155 having a suction line 157 from a hydraulic reservoir 159 at atmospheric pressure. If desired, the vents from both the direct acting pump 11 and the fifth staging cylinder 109 may connect to reservoir 159. Motive means 161, such as a continuous duty electric motor, is provided to drive constant delivery pump 155. Hydraulic fluid under pressure sufficient to operate the system is delivered from the constant delivery pump 155 through conduit 163 to a four way valve 165 controlled by two solenoids 167, and 169 and a spring return to a flow-through position when neither solenoid is energized. Solenoid 167, when energized, positions the valve 165 to direct flow to a conduit 171 connecting to a hydraulic actuating fluid replenishing system for the staging cylinders which will be described in greater detail hereinafter. Solenoid 169, when energized, positions valve 165 to direct flow to actuating fluid conduit 71, which, as hereinabove described, connects through actuating fluid port 73 to deliver hydraulic fluid into the actuating fluid chamber 19 therein to impinge on surface 75 of the piston 23 and urge the piston and plunger 21 through a compression stroke. When neither of the solenoids 167, 169 is energized, valving to conduits 171 and 71 is closed and the constant delivery pump output flows through conduit 163, the valve 165 and a return conduit 163a into reservoir 159. A second or return flow control valve 173 operated by a solenoid 175 is arranged in another return conduit 177 which connects into actuating fluid conduit 71. Solenoid 175 is energized during the return stroke of plunger/piston 21/23, and opens valve 173 to permit flow of the hydraulic actuating fluid from the actuating fluid chamber 19, through actuating fluid port 73, conduit 71, valve 173, and return conduit 177 into reservoir 159. In the event that the main plunger and piston tends to accelerate too rapidly on the return stroke, an adjustable flow restrictor 179 may be inserted in the return conduit 177 as shown in the drawing.

The extremities of travel of the plunger 21 and piston 23 are sensed by electrical compression and return stroke master contractors 181 and 183 indicated in FIGURE 1 and shown schematically in FIGURE 2 of the drawings. These contactors may take the form of conventional limit switches and are arranged exterior of the pump 11 to be mechanically actuated by an actuating stud 185 on an actuating rod 187. Actuating rod 187 is attached at one end to the piston 23 and extends therefrom through a suitable packing gland 189 in a wall of actuating head 15. The control circuitry is arranged so that at the completion of each compression stroke, stud 185 closes return stroke master contactor 183, which will then be maintained closed for a predetermined time corresponding to the time required for completion of the return stroke. This "maintain closed" condition may be accomplished in any one of several conventional ways such as for example a seal-in circuit paralleled with the contactor 183 as indicated schematically in circuit 3, FIGURE 2 of the drawings. Simultaneously with the contact 183 closure, an interruption is effected in the compression stroke master contactor 181 circuit, deenergizing solenoid 169 and permitting the four way valve 165 to return automatically to its flow-through position. With the actuating fluid pressure in chamber 19 thus relieved, the return stroke commences by virtue of the pressure of the pumped fluid entering chamber 17 through intake port 81 from intake conduit 79 to impinge on working face 83 of piston 21. If the intake or suction pressure in the low pressure intake source 97 is inadequate to effect the return stroke completely and at a desired velocity, vent 85 may be connected into a pressurized zone of the hydraulic actuating system to introduce abetting return stroke pressure against the surface 77 of piston 23.

At the completion of each return stroke, stud 185 simultaneously effects opening of the return stroke master contactor circuit and closes compression stroke master contactor 181 which will then be maintained closed, by means of a seal-in circuit for example, for a predetermined time corresponding to the time required for completion of a discharge or compression stroke. This action deenergizes the solenoid 175, closing return flow valve 173 and energizes solenoid 169, directing actuating fluid flow from the constant delivery pump 155, through four way valve 165 into actuating fluid conduit 71, until the compression stroke is completed and the stud 185 again closes contactor 183 to repeat the cycle. FIGURE 2 of the drawings illustrate a control scheme to effect the above-described operation of the pump. At the completion of a compression stroke, contactor 183 in circuit 3 is closed, energizing relay coil 184 which in turn effects closure of seal-in contactor 184a, contactor 184a' in circuit 5, and opening of contactor 184b in circuit 4, contactor 184b' in circuit 6 and contactor 184b'' in circuit 8. Seal-in contactor 184a, while closed, maintains relay coil 184 energized during the entire suction or return stroke. Closure of contactor 184a' in circuit 5 energizes solenoid 175 to open return flow valve 173, the opening of contactor 184b deenergizes relay coil 182 in circuit 4, the compression stroke circuit, and the opening of contactor 184b' in circuit 6 deenergizes solenoid 169, permitting four way valve 165 to spring-return to its flow-through position. Opening of contactor 184b'' in circuit 8 prevents energization of a replenishing cycle programmer which will be further described hereinafter.

At the completion of the return stroke, contactor 181 in circuit 4 is closed, energizing relay coil 182 which in turn effects closure of seal-in contactor 182a, contactor 182a' in circuit 6, and opening of contactor 182b in circuit 3 and contactor 182b' in circuit 5. Seal-in contactor 182a, while closed, maintains relay coil 182 energized during the compression stroke. Closure of contactor 182a' in circuit 6 energizes solenoid 169 to direct constant delivery flow of hydraulic fluid into actuating fluid conduit 71. The opening of contactor 182b deenergizes relay coil 184 in circuit 3, the return stroke circuit, and the opening of contactor 182b' in circuit 5 deenergizes solenoid 175, closing return flow valve 173. The illustrated and aforedescribed control cycle may, of course, be effected in other ways familiar to persons skilled in the electromechanical arts.

As the system is operated, in accordance with the foregoing description, over prolonged periods of time, it will be found occasionally that sufficient hydraulic actuating fluid will have migrated across the packings of one or more of the staging cylinders to permit a piston to contact the interior low pressure end of its respective cylinder. Should such action occur, the automatic staging system will not operate satisfactorily, and one or more of the main pump 11 packings 29, 31, etc. will be subjected to a greater pressure differential loading than intended. Inspection of the drawings will indicate that if a piston of any one of the five staging cylinders is permitted to "bottom" or impinge on the low pressure end of its movement against a staging cylinder end wall interior, all the staging pressures from that point on down will be diminished and certain of both the staging cylinder packings and the main pump packings may be improperly loaded. Such malfunctioning of the apparatus for any appreciable period of time is precluded by provision of a hydraulic actuating fluid replenishing system supplied through conduit 171, through four way valve 165 from the constant delivery pump 155. Action of a replenishing system cycle is initiated through a replenishing master pressure switch 191 located in the 20,000 p.s.i.g. pressure supply conduit 69 between staging cylinder 109 and pressure zone 49 in the pump 11. Since the ultimate effect of bottoming in any of the staging cylinders will be a reduction of the 20,000 p.s.i.g. pressure in conduit 69 during a compression stroke, the switch 191 is set to close when this pressure drops below 20,000 p.s.i.g. during a compression stroke. Since, in normal operation, the pressure in conduit 69 will drop considerably below 20,000 p.s.i.g. during each return stroke, operation of pressure switch 191 in circuit 8, FIGURE 2, is rendered ineffective by inclusion in this same circuit of the aforementioned 184b'' contactor, held open by relay coil 184 during each return stroke. Closure of the pressure switch 191 energizes relay coil 192 in circuit 8, FIGURE 2 of the drawings which closes contactors 192a, for seal-in and, referring to FIGURE 4, motor contactors 192a' to start a programmer 193, initiating a programmed replenishing cycle. Programmer 193 comprises a sychronous driving motor and five cams 195, 197, 199, 201, and 203 mounted on a common shaft. The diagrammatic arrangement of the programmer, as well as other circuitry, is shown in FIGURES 2 and 4 of the drawings. Cam 195 closes contactor 205, energizing relay coil 207 which simultaneously closes contactor 207a and opens contactor 207b arranged respectively in circuits 5 and 6 of FIGURE 2 of the drawings. The closure of contactor 207a in circuit 5 energizes the solenoid 175, permitting the next occurring return stroke of the main pump to exhaust hydraulic fluid through return flow valve 173 to the reservoir. The opening of contactor 207b in circuit 6 deenergizes and prevents energization of solenoid 169, precluding the pumping of actuating fluid to the main pump 11.

In the next programmed step, cam 197 closes contactor 209, energizing relay coil 211 which closes contactor 211a in circuit 10 of FIGURE 2 of the drawings. The closure of contactor 211a in circuit 10 energizes and opens a motor valve 213, permitting a recycling of the pumped process fluid from the low pressure pumped fluid source 97 back to a low pressure point in the process through staging pressure conduit 123 via pumped fluid chamber 17. This action relieves pressure at the high pressure end of staging cylinder 101.

Next, cam 199 closes contactor 215, energizing relay coil 217 which closes contactor 217a in circuit 11. Contactor 217a, upon closing, energizes motor valves 219, 221, 223 and 225, opening these valves to permit exhausting or venting of hydraulic actuating fluid from the staging cylinders and their inter-packing pressure zones through the staging pressure conduits back to the reservoir 159.

Cam 201 then closes contactor 227, energizing relay coil 229 which closes contactor 229a in circuit 12. Closure of 229 in circuit 12 energizes motor valves 231, 233, 235, 237 and 239, opening these valves to effect a manifold connection between the replenishing conduit 171 and the staging pressure feedback conduits 153, 151, 149 and 147 and the second staging pressure conduit 129.

Cam 203 then closes contactor 241, energizing relay coil 243 which simultaneously closes contactor 243a in circuit 13 and opens contactor 243b in circuit 6. Closure of contactor 243a energizes solenoid 167 which positions the four way valve 165 to direct the constant delivery pump 155 output to replenishing conduit 171. Hydraulic fluid will now be directed into the staging system through the manifold conduit arrangement and, since the low pressure, or piston head end of each of the staging cylinder is larger than the higher pressure or plunger end, and since both ends will be subjected to the same hydraulic pressure, all the staging cylinder piston/piston heads will be driven to the high pressure ends of the staging cylinders. When all of the piston/piston heads have been forced to the high pressure ends of the staging cylinders, the staging system will be completely refilled in all low pressure zones for effective cascading operation and there will occur a pressure increase in the replenishing manifold system which will be sensed by a pressure switch 245 in the replenishing conduit 171. Closure of pressure switch 245 energizes relay coil 247 in circuit 9 of FIGURE 2 of the drawings which effects a reversal of programmer 193 by opening the 247b contact in circuit 8 and simultaneously closing a seal-in contact 247a in circuit 9 and the programming motor reversing contactors 247a'. Energizing relay coil 247 also opens the 247b' contactor in circuit 13, deenergizing solenoid valve 167 and effecting constant delivery pump output back to the reservoir.

With the replenishing programmer reversed, the above operations will be repeated in reverse order until pressure switch 191 in circuit 8 reopens. In this condition, automatic operation of the system will resume in the normal manner.

From the foregoing description it will be appreciated by persons familiar with the art that the apparatus according to my invention comprehends a high pressure fluid actuating or pumping system comprising a reciprocating pump having an actuating fluid chamber and an actuated or pumped fluid chamber in combination with a plunger arranged interior of the pump and adapted to move reciprocally therein in a continual series of compression and return strokes. During each compression stroke, as actuating fluid is introduced under pressure into the actuating fluid chamber, actuated or pumped fluid is discharged at a high pressure from the pumping chamber end of the pump. Sealing between the actuated or pumped fluid and the actuating fluid is effected by means of a multiplicity of packings arranged in the pump to effect peripheral contact with the plunger along its longitudinal dimension. The individual packings are arranged in spaced relationship with respect to each other to define a multiplicity of fluid zones between the pumped fluid chamber and the actuating fluid chamber. An actuating fluid pressurizing system is provided to effect substantially constant delivery of an actuating fluid at a relatively low pressure for the entire pump actuating system. In addition, in combination with the foregoing components, an actuating fluid pressure staging or intensifying system is provided. Conduit means are provided to connect the actuating fluid chamber and the actuating fluid pressurizing system, the actuating fluid pressurizing system and the actuating fluid pressure intensifying system, the actuating fluid pressure intensifying system and the fluid zones defined between the packings and the actuating fluid pressure intensifying system and the high pressure actuated or pumped fluid chamber. Also provided are control means adapted to effect delivery of pressurized actuating fluid to the actuating fluid chamber and simultaneous delivery of actuating fluid at several discreet cascaded or intensified pressures to the fluid zones defined between the packings during each compression stroke.

While I have described hereinabove in considerable detail the control apparatus and circuitry for use with a working embodiment of the present invention, it is not inconceivable that persons familiar with the art will, in the light of my disclosure, comprehend numerous alternative control schemes.

The foregoing description, therefore, has been given for clearness of understanding only and no unwarranted limitations should be understood therefrom, it being intended to define the present invention in the terms of the appended claims.

What is claimed is:

1. A fluid actuating system comprising, in combination, a reciprocating pump having an actuating fluid chamber and an actuated fluid chamber; a plunger arranged interior of said pump and adapted to move reciprocally therein in a continual series of compression strokes and return strokes to effect discharge of actuated fluid at a high pressure from said actuated fluid chamber simultaneously with introduction of an actuating fluid at a relatively low pressure into said actuating fluid chamber during each of said compression strokes and intake of actuated fluid into said actuated fluid chamber simultaneously with discharge of actuating fluid from said actuating fluid chamber during each of said return strokes; a multiplicity of packings in said pump arranged to effect peripheral contact with said plunger at least partially along its longitudinal dimension and further arranged in spaced relationship each with respect to others to define a fluid zone between each pair of said packings; an actuating fluid pressurizing system to effect substantially constant delivery actuating fluid flow; an actuating fluid pressure intensifying system; conduit means respectively connecting said actuating fluid chamber and said actuating fluid pressurizing system, said actuating fluid pressurizing system and said actuating fluid pressure intensifying system, said actuating fluid pressure intensifying system and said fluid zone, and said actuating fluid pressure intensifying system and said actuated fluid chamber; and control means operatively connected in said conduit means adapted to effect delivery of pressurized actuating fluid to said actuating fluid chamber and simultaneous delivery of actuating fluid at respective discrete intensified pressures less than said high pressure and greater than said relatively low pressure to respective fluid zones defined between said packings during each of said compression strokes.

2. A fluid actuating system comprising, in combination, a reciprocating pump having an actuating fluid chamber and an actuated fluid chamber; a plunger arranged interior of said pump and adapted to move reciprocally therein in a continual series of compression strokes and return strokes to effect discharge of actuated fluid at a high pressure from said actuated fluid chamber simultaneously with introduction of an actuating fluid at a relatively low pressure into said actuating fluid chamber during each of said compression strokes and intake of actuated fluid into said actuated fluid chamber simultaneously with discharge of actuating fluid from said actuating fluid chamber during each of said return strokes; a multiplicity of packings in said pump arranged to effect peripheral contact with said plunger a least partially along its longitudinal dimension and further arranged in spaced relationship each with respect to others to define a fluid zone between each pair of said packings; an actuating fluid pressurizing system to effect substantially constant delivery actuating fluid flow; means to intensify said actuating fluid at a number of discrete pressures, said number corresponding to the number of said fluid zones defined between the respective pairs of packings and each of said discrete pressures being less than said high pressure and greater than said relatively low pressure; conduit means respecively connecting said actuating fluid chamber and said actuating fluid pressurizing system, said actuating fluid pressurizing system and said means to intensify said actuating fluid, said means to intensifying said actuating fluid and each said fluid zone, and means to intensify said actuating fluid and said actuated fluid chamber; and control means operatively connected in said conduit means adapted to effect delivery of pressurized actuating fluid to said actuating fluid chamber and simultaneous delivery of actuating fluid at respective discrete intensified pressures less than said high pressure and greater than said relatively low pressure to respective fluid zones defined between said packings during each of said compression strokes.

3. A system according to claim 2 wherein said means to intensify said actuating fluid to a number of discrete pressures comprises a multiplicity of pressure staging cylinders, each having a reciprocally movable plunger, said cylinders being serially connected in cascaded pressure relationship by respective conduits, each respective conduit having means therein included for connection to a respective conduit means connecting the actuating fluid intensifying means and a fluid zone.

4. A high pressure fluid pumping system comprising, in combination, a reciprocating pump having an actuating fluid chamber and a pumped fluid chamber; a plunger arranged interior of said pump and adapted to move reciprocally therein in a continual series of compression strokes and return strokes to effect discharge of pumped fluid at a high pressure from said pumped fluid chamber simultaneously with introduction of an actuating fluid at a relatively low pressure into said actuating fluid chamber during each of said compression strokes and intake of pumped fluid into said pumped fluid chamber simultaneously with discharge of actuating fluid from said actuating fluid chamber during each of said return strokes; a multiplicity of packings in said pump arranged to effect peripheral contact with said plunger partially along its longitudinal dimension between said pumped fluid chamber and said actuating fluid chamber and further arranged in spaced relationship each with respect to others to define a multiplicity of fluid zones between said pumped fluid chamber and said actuating fluid chamber, one of said fluid zones being defined between each pair of said packings; an actuating fluid pressurizing system to effect substantially constant delivery actuating fluid flow at relatively low pressure; means to intensify said actuating fluid to a number of discrete pressures, said number corresponding to the number of fluid zones defined between the respective pairs of packings and each of said discrete pressures being less than said high pressure and greater than said relatively low pressure; conduit means respectively connecting said actuating fluid chamber and said actuating fluid pressurizing system, said actuating fluid pressurizing system and the actuating fluid intensifying means, the actuating fluid intensifying means and said fluid zones defined between said packings, and the actuating fluid intensifying means and said pumped fluid chamber; and control means operatively connected in said conduit means adapted to effect delivery of pressurized actuating fluid to said actuating fluid chamber and simultaneous delivery of actuating fluid at respective discreet intensified pressures to respective fluid zones defined between said packings during each of said compression strokes, each of said discrete intensified pressures being less than said high pressure in the pumped fluid chamber and less than a pressure in a fluid zone contiguous to the zone associated with said discreet pressure towards the pumped fluid chamber.

5. A system according to claim 4 wherein said means to intensify said actuating fluid to a number of discrete pressures comprises a multiplicity of pressure staging cylinders, each having a reciprocally moveable plunger, said cylinders being serially connected in cascaded pressure relationship by respective conduits, each respective conduit having means therein included for connection to a respective conduit means connecting the actuating fluid intensifying means and a fluid zone.

6. Apparatus according to claim 5 combined with an actuating fluid replenishing system comprising, in combination, a pressure sensitive switch in the conduit means connecting the actuating fluid intensifying means to one of said fluid zones, said switch being adapted to close an electrical circuit upon a decrease in the discrete fluid pressure directed to said fluid zone during each compression stroke; a programmer device in circuit with said pressure sensitive switch; a multiplicity of electrically operated valve means in circuit with said programmer; and electrical relay means in circuit with the programmer device and the valve means to effect, in sequence, deenergization of that portion of the control means associated with normal operation, delivery of actuating fluid into the actuating fluid intensifying cylinders and their related conduits, deenergization of the programmer and reenergization of that portion of the control means associated with normal operation.

References Cited by the Examiner

UNITED STATES PATENTS 2,864,313 12/58 Dawson _____ 103—50 X
2,884,860 5/59 Ellis et al. _____ 103—50

FOREIGN PATENTS 704,032 2/54 Great Britain.

LAURENCE V. EFNER, *Primary Examiner.*
ROBERT M. WALKER, *Examiner.*